(12) United States Patent
Li et al.

(10) Patent No.: US 6,372,374 B1
(45) Date of Patent: Apr. 16, 2002

(54) BIPOLAR SEPARATOR PLATE WITH IMPROVED WET SEALS

(75) Inventors: Jian Li; Chao-Yi Yuh, both of New Milford; Thomas Lucas, Colebrook; Michael Primerano, Torrington, all of CT (US)

(73) Assignee: FuelCell Energy, Inc., Danbury, CT (US)

( * ) Notice: Subject to any disclaimer, the term of this patent is extended or adjusted under 35 U.S.C. 154(b) by 0 days.

(21) Appl. No.: 09/451,132

(22) Filed: Nov. 30, 1999

(51) Int. Cl.[7] ............................................... H01M 8/04
(52) U.S. Cl. ............................... 429/36; 429/32; 429/38
(58) Field of Search ............................... 429/32, 34, 35, 429/36, 37, 38

(56) References Cited

U.S. PATENT DOCUMENTS

| | | | | | |
|---|---|---|---|---|---|
| 4,160,067 A | * | 7/1979 | Camara et al. | ................ | 426/16 |
| 4,300,956 A | * | 11/1981 | Rosenberger | ................ | 148/6.3 |
| 4,514,475 A | * | 4/1985 | Mientek | ................ | 429/35 |
| 4,604,331 A | * | 8/1986 | Louis | ................ | 429/35 |
| 4,609,595 A | * | 9/1986 | Nickols | ................ | 429/35 |
| 5,698,337 A | | 12/1997 | Nitschké et al. | ................ | 429/35 |
| 5,773,161 A | | 6/1998 | Farooque et al. | ................ | 429/34 |
| 6,159,627 A | * | 12/2000 | Yuh et al. | ................ | 429/34 |

OTHER PUBLICATIONS

Patent Abstracts of Japan No. 07230175, published Mar. 28, 1997.
Patent Abstracts of Japan No. 07295276, published May 27, 1997.
Patent Abstracts of Japan No. 09025822, published Jul. 08, 1998.
U.S. Patent application Ser. No. 09/135,737, filed Aug. 18, 1998, (Now U.S. Pat. No. 6159627)(Dec. 2000).

* cited by examiner

Primary Examiner—Stephen Kalafut
(74) Attorney, Agent, or Firm—Robin, Blecker & Daley (57) ABSTRACT

A bipolar separator formed from a plate member and first, second, third and fourth pocket members separately formed from the plate member. The plate member is fabricated from a stainless steel material and each of the pocket members is fabricated from a stainless steel with an aluminum coating. Welds including aluminum affix the pocket members to the plate member.

19 Claims, 6 Drawing Sheets

BIPOLAR SEPARATOR PLATE WITH IMPROVED WET SEALS

BACKGROUND OF THE INVENTION

This invention relates to a bipolar separator and, in particular, to a bipolar separator for use in carbonate fuel cells.

The bipolar separator used in carbonate fuel cells is required to provide current transmission, reactant gas separation and load pressure distribution in a high temperature corrosive environment. The separator is exposed to a reducing gas mixture of $H_2$, $N_2$, $H_2O$, CO and $CO_2$, on the anode side and to an oxidizing gas mixture of $O_2$, $N_2$, $H_2O$, and $CO_2$ on the cathode side. Moreover, it must withstand fuel cell operating temperatures near 650° C. in the presence of a liquid alkaline carbonate electrolyte.

A typical bipolar plate of this type comprises a thin flat metal plate member having first and second opposing surfaces which form active areas and which are compatible with oxidant and fuel gases, respectively. First and second opposing ends of these areas are folded upward and toward each other to form first and second pockets. Third and fourth opposing ends of the areas are folded downward and toward each other to form third and fourth pockets. The first and second pockets support a fuel cell matrix on the first surface side of the plate member, while the third and fourth pockets support a fuel cell matrix on the second surface side of the plate member. These pockets, thus, form wet-seals for the carbonate fuel cells in which the bipolar separator is employed.

A significant concern in designing a bipolar separator is fabricating the plate member so that the wet seals and edges of the plate member are kept corrosion free for realizing long term stability. The wet-seals are wetted by the molten carbonate electrolyte in the presence of both reducing and oxidizing atmospheres. This greatly accelerates the corrosion attack. However, because the wet-seals are not in the electrical pathway, high electrical conduction is not required. On the other hand, the active areas of the plate member provide the electrical conduction. These areas are thus required to conduct generated electrons and, therefore, need to be highly conductive in order to minimize any internal ohmic dissipation.

Currently, one technique for fabricating the bipolar separator is to form the separator from a Ni-coated or clad stainless steel sheet. This type of fabrication is desirable because pure Ni remains metallic in the low oxygen partial pressure fuel environment of the carbonate fuel cell, while stainless steel is somewhat more stable in the oxidizing cathode environment of such cell.

However, when such a sheet is used to fabricate the bipolar plate, an additional corrosion protection coating is required for the aforementioned wet-seals of the sheet to alleviate the more aggressive hot corrosion which takes place at these areas. This additional coating is required to be uniform in thickness and nearly dense. At the carbonate fuel cell operating temperature, interdiffusion between the coating and the base metal forms a highly corrosion resistant protective layer.

To date, the wet-seal protective coating is usually formed from Al or Al/Fe (see, e.g., Japanese Patent 09025822). This coating may be applied by thermal spray (see, e.g., Japanese Patents 09025822, 07295276), high velocity oxy-fuel flame spray (HVOF) (see, e.g., U.S. Pat. No. 5,698,337), Al painting, ion vapor deposition, or molten Al dip-coating (see, e.g., Japanese Patent 07230175). Currently, the thermal spray techniques, such as conventional thermal spray and HVOF, are widely utilized.

When using the thermal spray techniques to apply the Al coating, considerations relating to coating adhesion and substrate warpage, require that the coating be applied after the bipolar separator has been formed. This necessitates handling and masking of the large thin stainless steel sheet during the coating process. The need to handle and mask the sheet adds significantly to the bipolar separator manufacturing costs.

Furthermore, extensive control must be exercised over the coating process to meet the quality required in fuel cell use. A satisfactory coating can only be achieved by following costly quality control procedures, including pre-surface preparation, coating thickness and roughness inspections, visual defect and coverage inspection and periodic metallographic examination.

Additionally, even using these procedures, the resultant coating still forms a thick loose layer of aluminum oxide on top of the interdiffusion zone during fuel cell operation. This causes undesired flaky debris at the exposed surfaces. To avoid the flaky oxide layer and achieve a defect-free interdiffusion protective zone, a high-temperature diffusion heat treatment prior to the fuel cell application is required. This treatment introduces undesired thermal distortion to the bipolar plate.

As above-described, the pockets forming the wet seals of the bipolar separator are situated at the ends of the metal plate and extend either downward or upward and then toward each other. If Ni-coated stainless steel is used for the bipolar separator, one set of pockets will have Ni on their exterior surfaces. This Ni has to be removed before coating the pockets with Al, since applying the Al coating to the Ni provides insufficient corrosion protection in the fuel cell environment.

As for the active-area formed by the opposing first and second surfaces of the bipolar plate, a high-Cr stainless steel is favored for corrosion protection on the cathode side surface. However, excessive Cr content may lead to poorly electrical conductive corrosion products and additional electrolyte loss.

It is therefore an object of the present invention to provide a bipolar separator which avoids the above-mentioned disadvantages.

It is a further object of the present invention to provide a bipolar separator which can be easily and cost-effectively fabricated.

SUMMARY OF THE INVENTION

In accordance with the principles of the present invention, the above and other objectives are realized in a bipolar separator in which the separator comprises a plate member having opposing first and second surfaces compatible with fuel gas and oxidant gas, respectively, and first and second pocket members and third and fourth pocket members which are separately formed from the plate member. In accord with the invention, the first and second pocket members are joined to opposing first and second ends of the plate member, respectively, by welds, so that the first and second members extend outward and upward of the plate member and then toward each other. Also, in accord with the invention, the third and fourth pocket members are joined to opposing third and fourth ends of the plate member, respectively, by welds, so that the third and fourth pocket members extend outward and downward of the plate member and then toward each other.

By forming all the pocket members separately from the plate member, the pocket members can be fabricated from a material which itself is highly resistant to corrosion in the fuel cell environment. More particularly, in accord with the invention, a stainless steel material provided with a corrosion resistant cladding is employed. Preferably, the cladding is made of aluminum.

Additionally, the separately formed plate member can now be fabricated from a material having characteristics desired for the first and second surfaces of the plate which form the active areas of the separator, i.e., high electrical conductivity, high corrosion resistance and low electrolyte loss. In accord with the invention, a stainless steel material is used. This material may have a nickel cladding.

In a further aspect of the invention, the welds employed to attach or affix the pocket members to the plate member are themselves formed to provide corrosion resistance. Preferably, Al is introduced into each weld to achieve the desired corrosion resistance.

BRIEF SUMMARY OF THE DRAWINGS

The above and other features and aspects of the present invention will become more apparent upon reading the following detail description in conjunction with the accompanying drawings in which.

DETAILED DESCRIPTION

Figure 1:
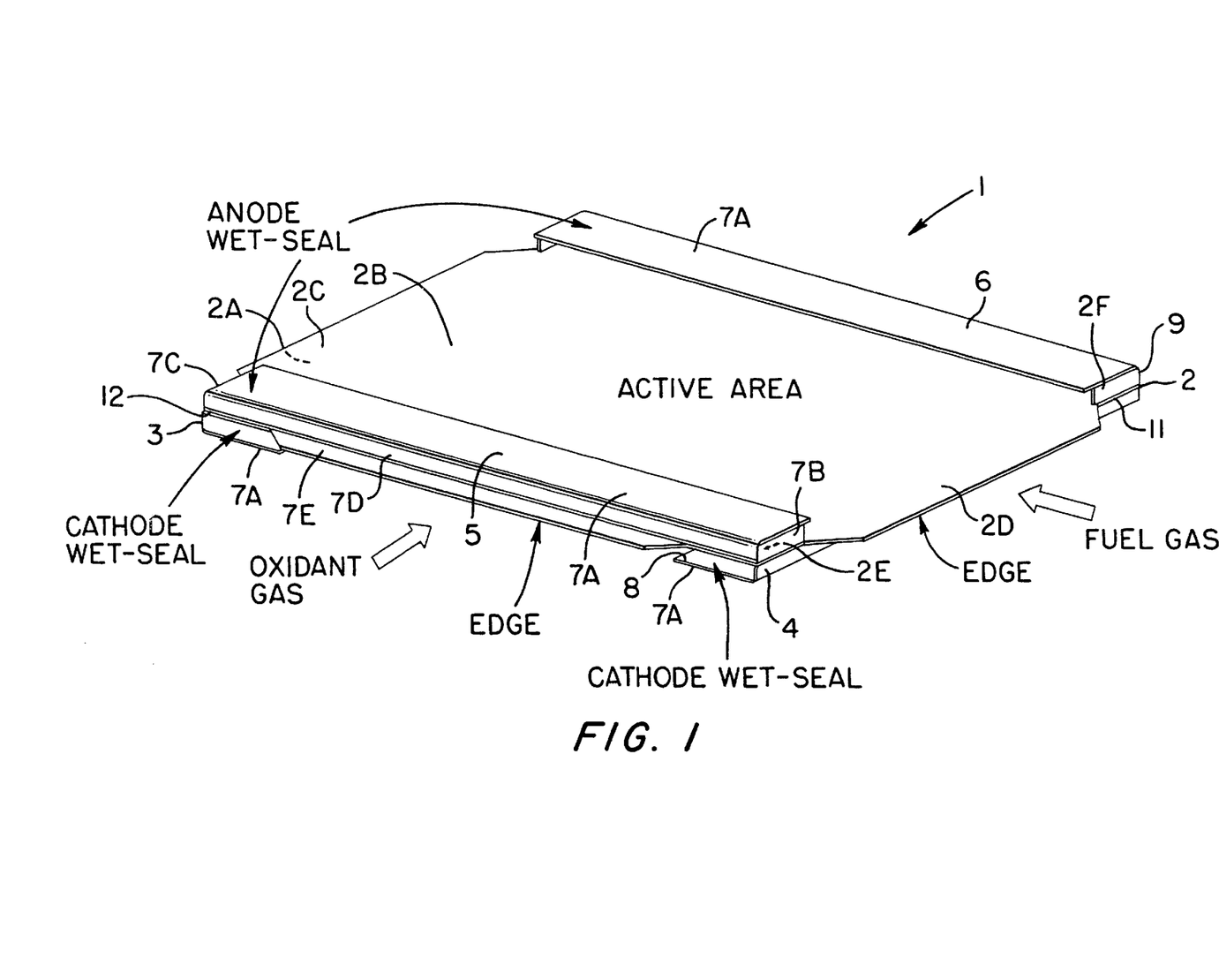
FIG. 1 shows a bipolar separator in accordance with the principles of the present invention.
Figure 2:
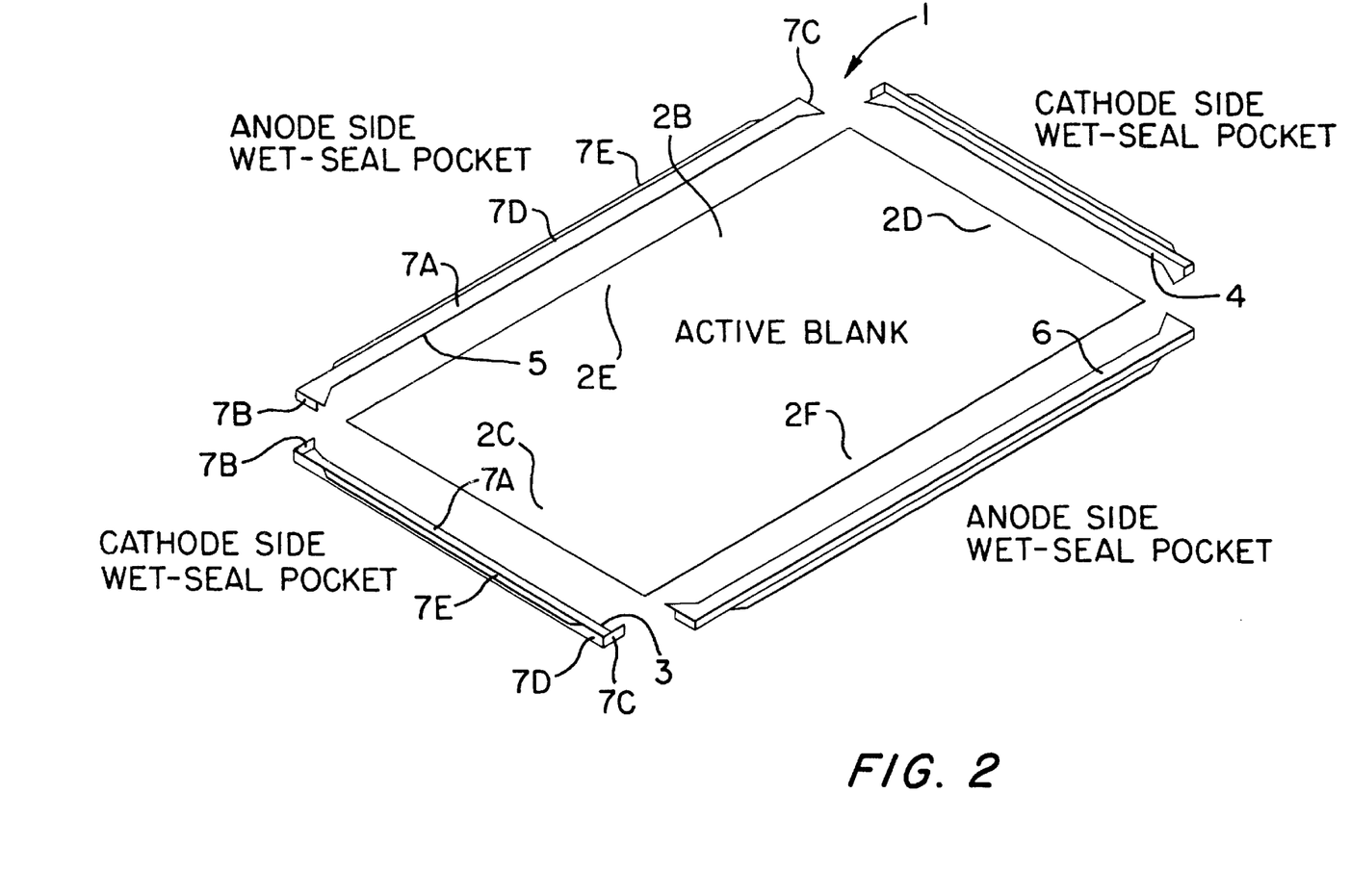
FIG. 2 shows the bipolar separator of FIG. 1 prior to the separately formed plate members and pocket members being joined together.

FIGS. 1 and 2 show a bipolar separator 1 for use with a carbonate fuel cell, in accordance with the principles of the present invention. The bipolar separator 1 includes a plate member 2 having first and second surfaces 2A and 2B which are compatible with oxidant and fuel gases, respectively. The member 2 also has opposing end sections 2C and 2D and 2E and 2F.

Adjacent each of the end sections, the plate 1 includes a pocket member. More particularly, pocket members 3 and 4 are situated adjacent the end sections 2C and 2D and pocket members 5 and 6 are situated adjacent the end sections 2E and 2F.

Each end pocket member includes a top wall 7A, side walls 7B and 7C, a back wall 7D and a back extension 7E. The pocket members 3 and 4 have their top walls 7A facing the first surface 2A of the member 2 which is oxidant gas compatible and, thus, are on the oxidant side of the bipolar separator 1. The pocket members 5 and 6, on the other hand, have their top walls 7A facing the second surface 2B of the member 2 which is fuel gas compatible and, thus, are on the fuel side of the bipolar separator 1.

In accordance with the invention, the plate member 2 is separately formed from the pocket members 3–6. As a result, the material used for the plate member can be selected to best meet the fuel cell environment requirements of this member, while the material used for the pocket members 3–6 can be selected to best meet the fuel cell environment requirements of these members. In particular, the plate member, whose first and second surfaces form the active areas for the bipolar separator 1 when the separator is incorporated in a carbonate fuel cell stack assembly, must be oxidant and fuel gas compatible, while resistant to corrosion, highly conductive and exhibit low corrosion-associated electrolyte loss. The pocket members, in turn, since they form wet-seals for the carbonate electrolyte, which they directly contact, and since they are exposed to the dual atmosphere of reducing and oxidizing hot gases, but are not in an electrical pathway, when the separator 1 is incorporated in a carbonate fuel cell stack assembly, need not be highly conductive, but must be highly resistant to corrosion and prevent corrosion-associated electrolyte loss.

These differing requirements are satisfied, in accordance with the invention, by forming the plate member 2 from a first material and the plate members 3–6 from a second different material. In particular, in the case where electrolyte is expected to creep on the fuel gas side of the member 2, the member 2 is formed from a stainless steel having a Ni clad or coating. This coating forms the second surface 2B on the fuel gas side of the plate member 2. Preferably, the stainless steel is a high alloying austenitic stainless steel with a moderate Cr content (18–26% wt), as compared to 310 stainless steels and a higher Ni content (11–33% wt), as compared to 18-8 type stainless steels. Also, preferably, the Ni cladding or coating has a thickness of 25–50 $\mu$m. With this type of material for the plate member 2, a superior hot corrosion/oxidation resistance is exhibited, as compared to the 18-8 type stainless steels with a corrosion scale electrical conductivity higher than 310 stainless steels. Thus, the member 2 exhibits sufficient endurance life for carbonate fuel cell application.

In the case where electrolyte is not expected to creep on the fuel gas side of the member 2 and the adjoining fuel cell components have non-wetting surfaces, Ni protection is not necessary on the fuel gas side, i.e., on the surface 2B. As a result, the member 2 can be formed from a high-alloying stainless steel without a Ni cladding and this will provide the member 2 with sufficient corrosion resistance for long-term carbonate fuel cell application.

The pocket members 3–6, in turn, in accordance with the invention, are formed from an Al coated or clad stainless steel. The Al coating can be on one or both surfaces of the stainless steel material. The Al coating is fully dense, uniform in thickness and well bonded to the base stainless steel material. With such a coating, a defect free in-situ diffused corrosion protection layer is formed on the pocket members upon diffusion in the temperature range between 500 and 650° C. This occurs after assembly of the bipolar separator 1 in a carbonate fuel cell stack assembly and during stack start-up. No additional heat treatment for creating the corrosion protection layer is necessary.

Figure 4A:
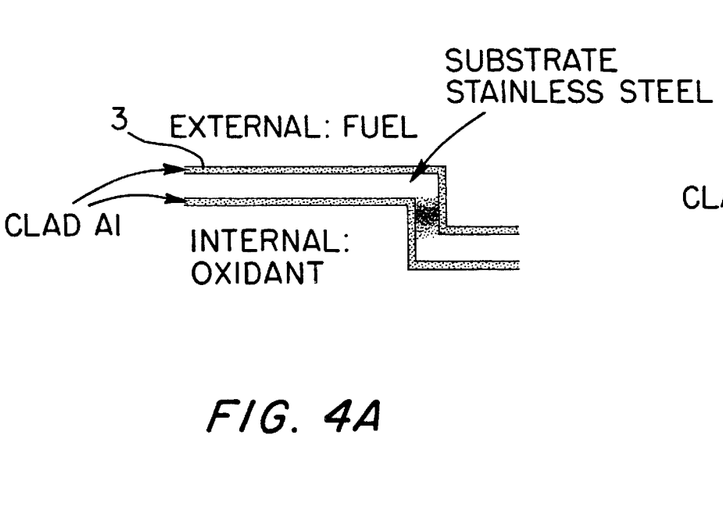
FIGS. 4A and 4B show the ends of alternative embodiments of the pocket members on the oxidant or cathode side of the bipolar separator of FIGS. 1 and 2.
Figure 4B:
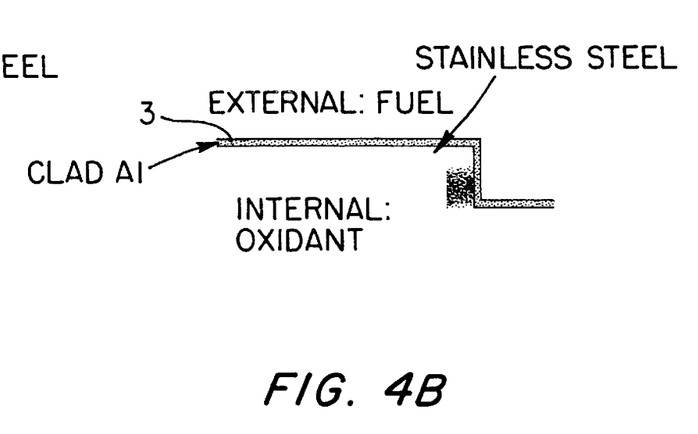
Figure 5A:
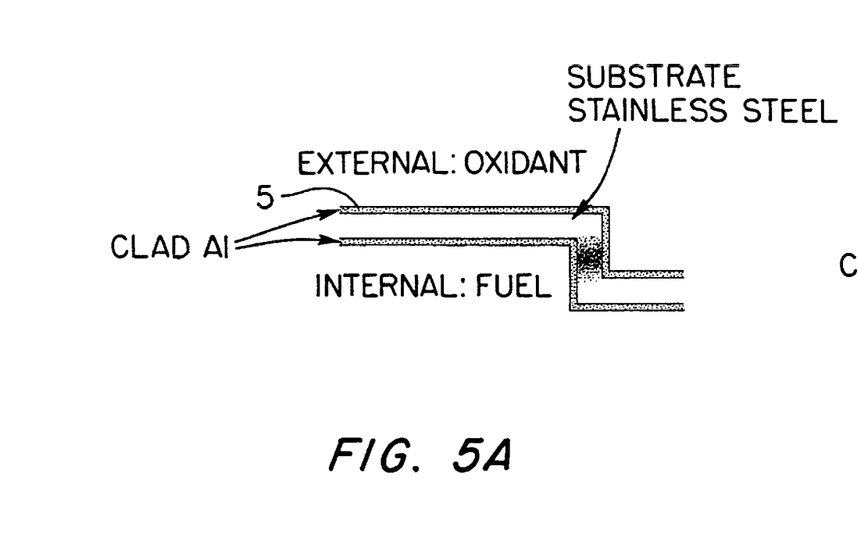
FIGS. 5A and 5B show the ends of alternative embodiments of the pocket members on the fuel side of the bipolar separator of FIGS. 1 and 2.
Figure 5B:
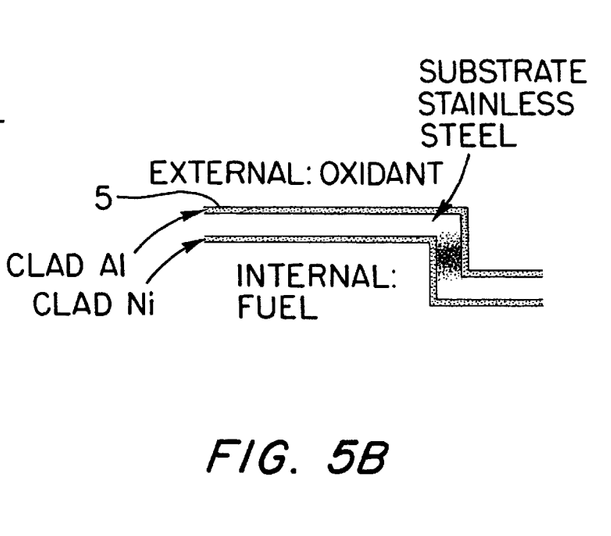

For the pocket members 3 and 4 on the oxidant gas side of the bipolar separator, the Al coating can be on the external face of the member (i.e., the face opposing the face facing the surface 2A) or on both the external face and internal face (i.e., the face facing the surface 2A) of the member. This is shown in FIGS. 4A and 4B. For the pocket members 5 and 6 on the fuel gas side of the plate member 2, the Al coating can also be on the internal or external faces of the member. Alternatively, in this case, the external face can be Al coated and the internal face Ni coated. This is shown in FIGS. 5A and 5B.

For the pocket members, the Al coating can have a thickness of 12–40 μm. If a Ni coating is used, it can have a thickness of 25 to 50 μm. Where a double sided coating is used, the stainless steel can be austenitic stainless steel with a Cr-content in the range of 16–20% wt and a Ni-content in the range of 8–14% wt. For the case of a single sided coating, a stainless steel of higher corrosion resistance is required. In this case, austenitic stainless steels or corrosion resistant alloys, with a Cr-content higher than 18% wt and a Ni-content higher than 11% wt are suitable.

Figure 3:
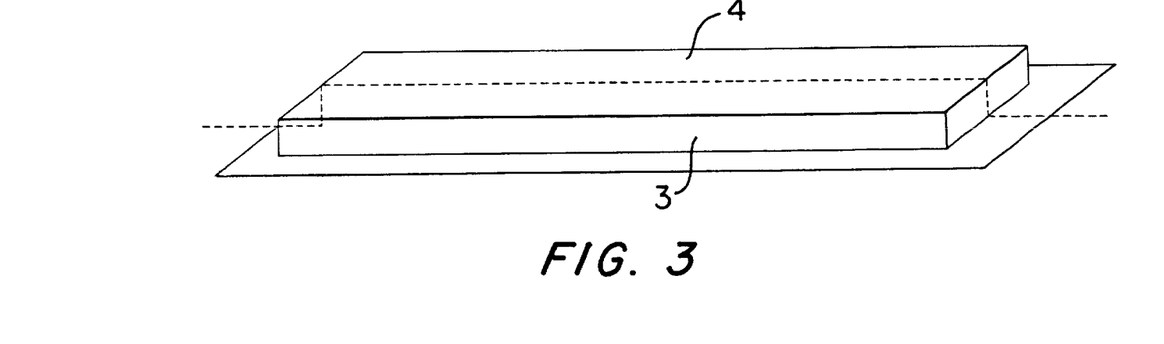
FIG. 3 shows schematically the formation of two of the pocket members used in the bipolar plate of FIGS. 1 and 2.

In forming the sets of pocket members 3 and 4 and 5 and 6, each set can be pressed formed simultaneously from a suitably coated stainless steel blank. The blank can then be split down the middle to form the two pockets. This is illustrated for the pockets 3 and 4 in FIG. 3.

As previously mentioned, the pocket members 3 and 4 and 5 and 6 are separately formed from the plate member 2. In accordance with the invention, the pocket members are then joined to their respective sides of the plate member by welding. This is shown in FIG. 1 by the welds 8, 9, 11 and 12, and schematically in FIG. 6 for the pocket 5.

Figure 6:
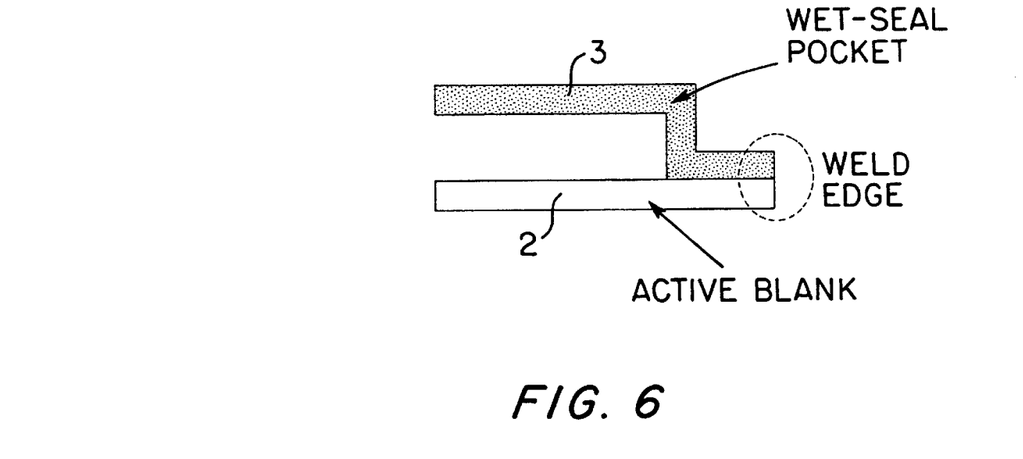
FIG. 6 shows a representative weld area of a pocket member to the plate member of the bipolar separator of FIGS. 1 and 2.

Since the weld areas 8, 9, 11 and 12 are exposed to the same fuel cell hot gas corrosion environment, in accord with the invention, a corrosion resistant material is also included in the weld material. Preferably, Al is included in the weld material for this purpose. This can be accomplished by utilizing Al-containing filler wires during the welding process. The filler wires can be pure Al, Al alloys, or high Al-content alloys such as alloys sold under the names Kanthal and Fecralloy composed of 22–24 Cr % wt, 4–6 Al % wt and the balance Fe. They can be fed either by an automated wire feeder or inlay of the wire along the weld seam during welding.

Figure 7:
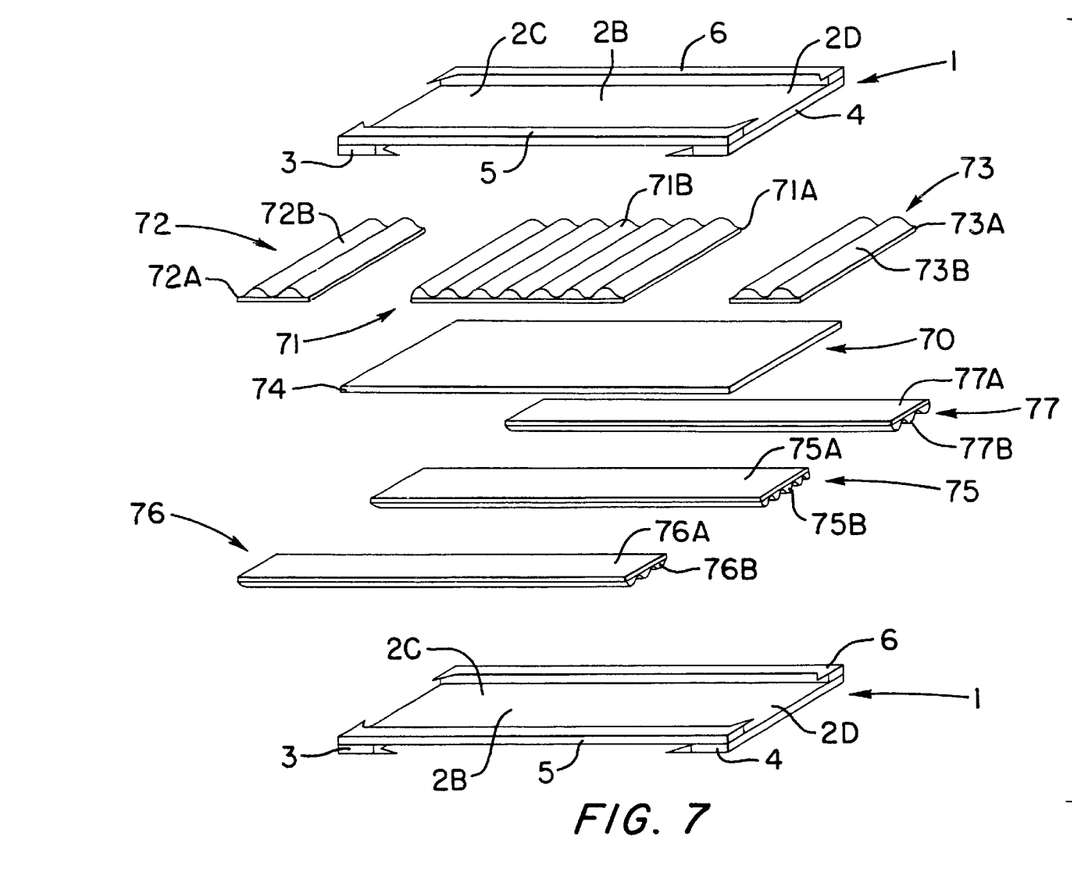
FIG. 7 shows the bipolar separator of FIGS. 1–2 incorporated into a fuel cell stack assembly.

FIG. 7 shows a fuel cell unit 70 comprising upper and lower bipolar plates 1 as shown in FIGS. 1–2. The fuel cell unit further includes a cathode element 71 comprised of a cathode electrode 71A and a cathode current collector 71B having a surface abutting one surface of the cathode electrode. The cathode element 71 extends over the length and width of the surface 2A of the upper bipolar separator 1. In particular, the longitudinal ends of the element extend to the pocket members 3 and 4 and the lateral ends extend to the sides 2E and 2F of the plate 2. Spacer elements 72 and 73 formed from spacer segments 72A, 73A and current collector segments 72B and 73B extend from respective ends of the cathode element 71 into the pocket members 3 and 4.

As can be appreciated, the cathode current collector elements 71B, 72B and 73B can be integrally formed as a one-piece element. Similarly, the cathode electrode 71A, spacer segment 72A and spacer segment 73A can be integrally formed as one piece.

The height of the cathode element 71 is made equal to that of the pocket members 3 and 4. The element 71 and pocket members thus form a flush surface for receiving an electrolyte matrix or tile 74 which abuts and extends over the entirety of this surface.

An anode element 75 formed of an anode electrode 75A and a corrugated anode current collector 75B follow the matrix element 74. One face of the anode electrode 75A abuts the matrix 74, while the other face abuts and supports one surface of the anode current collector 75B. The other surface of the anode current collector 75B rests on the surface 2B of the lower separator plate 1.

The anode element 75 extends laterally between the pocket areas 5 and 6 of the lower separator plate 1 and longitudinally to the ends 2C and 2D of the plate 2. Spacer elements 76 and 77 extend from the anode element 75 and fit into the latter pocket members. The spacer elements 76 and 77 include separator segments 76A and 77A and current collector segments 76B and 77B.

As with the cathode current collector elements, the anode current collector elements 75B, 76B and 77B can be formed as a single element. A similar situation holds true for the cathode elements 75A, 76A and 77A.

The anode element 75 sits on a flat surface formed by the surface 2B. The anode electrode 75A of the anode element 75 provides a flat surface for seating the lower surface of the electrode matrix 74.

As can be appreciated, the pocket members 3 and 4 of the upper separator plate 1 and the trough areas 5 and 6 of the lower separator plate 1 act as rails and the surfaces of these rails form wet-seals with the matrix 74. These wet-seals, in turn, keep the oxidant gas and fuel gas from leaking from the gas chambers formed by the cathode and anode elements and the separator plates, so as to prevent gas cross-over and gas escape form the fuel cell unit.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention.

What is claimed is:

1. A bipolar separator for use with a fuel cell comprising:
   a plate member having opposing first and second surfaces compatible with fuel gas and oxidant gas, respectively, said plate member including a first material and having first and second opposing ends and third and fourth opposing ends;

first, second, third and fourth pocket members separately formed from said plate member, each pocket member including a second material, said first and second pocket members being situated adjacent first and second opposing ends of said plate member and extending outward of said first surface and then toward each other, said third and fourth pocket members being situated adjacent said third and fourth opposing ends of said plate member and extending outward of said second surface and then toward each other;

first and second means for joining said first and second pocket members, respectively, to said first surface of said plate member at said first and second ends of said plate member;

third and fourth means for joining said third and fourth pocket members, respectively, to said second surface of said plate member at said third and fourth ends of said plate member; and each of said, first, second, third and fourth means being a weld.

2. A bipolar separator in accordance with claim 1 wherein:
   said first material is fuel gas compatible and is included on the first surface of said plate member;
   and said second material different from said first material is a corrosion resistant material.

3. A bipolar separator in accordance with claim 2 wherein:

said first material of said plate member includes stainless steel; and said second material of each of said pocket members includes stainless steel coated with aluminum.

4. A bipolar separator in accordance with claim 3 wherein: said weld includes aluminum.

5. A bipolar separator in accordance with claim 3 wherein:

said aluminum coating on said aluminum coated stainless steel of said third and fourth pocket members is on a surface opposing the surface facing the second surface of said plate member.

6. A bipolar separator in accordance with claim 5 wherein:

the stainless steel forming said third and fourth pocket members is austenitic stainless steel with a Cr-content higher than 18% wt. and a Ni content higher than 11% wt.

7. A bipolar separator in accordance with claim 3 wherein:

said aluminum coating on said aluminum coated stainless steel of said third and fourth pocket members is on a surface facing the second surface of said plate member and on the opposing surface.

8. A bipolar separator in accordance with claim 7 wherein:

the stainless steel forming said third and fourth pocket members is austenitic stainless steel with a Cr-content in the range of 16–20% wt and a Ni-content in the range of 8–14% wt.

9. A bipolar separator in accordance with claim 3 wherein:

said aluminum coating on said aluminum coated stainless steel of said first and second pocket members is on a surface opposing the surface facing the first surface of said plate member;

and further comprising a Ni coating on the surface of said material forming said first and second pocket members and facing said second surface of said plate member.

10. A bipolar separator in accordance with claim 9 wherein:

the stainless steel material forming said first and second pocket members is austenitic stainless steel with a Cr-content in the range of 16–20% wt and a Ni-content in the range of 8–14% wt.

11. A bipolar separator in accordance with claim 9 wherein:

the thickness of said Ni-coating on the material forming said first and second pockets is in a range from 25 to 50 $\mu$m.

12. A bipolar separator in accordance with claim 3 wherein:

said aluminum coating on said aluminum coated stainless steel of said first and second pocket members is on a surface facing the first surface of said plate member and on the opposing surface.

13. A bipolar separator in accordance with claim 12 wherein:

said stainless steel forming said first and second pocket members is austenitic stainless steel with a Cr-content in the range of 16–20% wt. and a Ni-content in the range of 8–14% wt.

14. A bipolar separator in accordance with claim 3 wherein:

said Al coating on said aluminum coated stainless steel of said pocket members has a thickness in the range of 12–40 $\mu$m.

15. A bipolar separator in accordance with claim 3 wherein:

said stainless steel of said first material has a nickel coating on said first surface of said plate member.

16. A bipolar separator in accordance with claim 15 wherein:

said nickel coating of said stainless steel of said first material has a thickness of 25–50 $\mu$m.

17. A bipolar separator in accordance with claim 3 wherein:

the stainless steel of said plate member is austenitic stainless steel with a Cr-content in the range of 18–26% wt. and a Ni-content in the range of 11–33% wt.

18. A bipolar separator in accordance with claim 3 wherein:

said weld includes aluminum content introduced into said weld by filler wires comprising one or more of pure aluminum, aluminum alloys, and high Al-content alloys composed of 22–24 Cr % wt, 4–6 Al % wt and the balance Fe.

19. A fuel cell stack assembly including one or more bipolar separators as claimed in claim 1.

* * * * *

UNITED STATES PATENT AND TRADEMARK OFFICE
CERTIFICATE OF CORRECTION

PATENT NO.   : 6,372,374 B1
DATED        : April 16, 2002
INVENTOR(S)  : Jian Li et al.

It is certified that error appears in the above-identified patent and that said Letters Patent is hereby corrected as shown below:

Column 1,
Line 3, insert -- STATEMENT AS TO RIGHTS TO INVENTIONS MADE UNDER FEDERALLY SPONSORED RESEARCH AND DEVELOPMENT
This invention was made with Government support under contract DE-FC21-95MC31184 awarded by the Department of Energy. The Government has certain rights in the invention. --.

Signed and Sealed this

Thirtieth Day of May, 2006

JON W. DUDAS
*Director of the United States Patent and Trademark Office*